United States Patent [19]
Anderson

[11] Patent Number: 5,247,904
[45] Date of Patent: Sep. 28, 1993

[54] HUMMINGBIRD FEEDER

[76] Inventor: James D. Anderson, P.O. Box 5048, Grants Pass, Oreg. 97527

[21] Appl. No.: 14,745

[22] Filed: Feb. 8, 1993

[51] Int. Cl.$^5$ .............................................. A01K 7/00
[52] U.S. Cl. ........................................ 119/72; 119/77
[58] Field of Search ............... 119/72, 72.5, 77, 52.2, 119/52.3, 52.4, 53.5, 54, 57.8, 57.9; D30/121, 124, 125, 129

[56] References Cited

U.S. PATENT DOCUMENTS

| | | | |
|---|---|---|---|
| 2,796,848 | 6/1957 | Zimmerman | 119/72 |
| 3,913,527 | 10/1975 | Kilham | 119/77 X |
| 4,558,662 | 12/1985 | Peterson | 119/77 |
| 4,691,665 | 9/1987 | Hefner | 119/77 |
| 4,729,344 | 3/1988 | Winkel | 119/53.5 |
| 4,840,143 | 6/1989 | Simon | 119/72 X |
| 4,901,673 | 2/1990 | Overstreet | 119/72 X |
| 5,062,390 | 11/1991 | Bescherer et al. | 119/72 |

Primary Examiner—John J. Wilson
Assistant Examiner—Thomas Price
Attorney, Agent, or Firm—Leon Gilden

[57] ABSTRACT

A hummingbird feeder includes a feeder base receiving a hummingbird feed solution therewithin, wherein the base has mounted thereto in a coaxially aligned relationship a support cylinder. The support cylinder includes a divider wall directed orthogonally relative to the axis of the support cylinder, with the divider wall accommodating fluid therewithin. The feeder base having a mounting post and a support post directed through the support cylinder, and the divider wall received within the support post, whereupon suspension of the hummingbird feeder by the support post prevents crawling insects from access to the base due to the support post being positioned within a surrounding body of fluid.

3 Claims, 4 Drawing Sheets

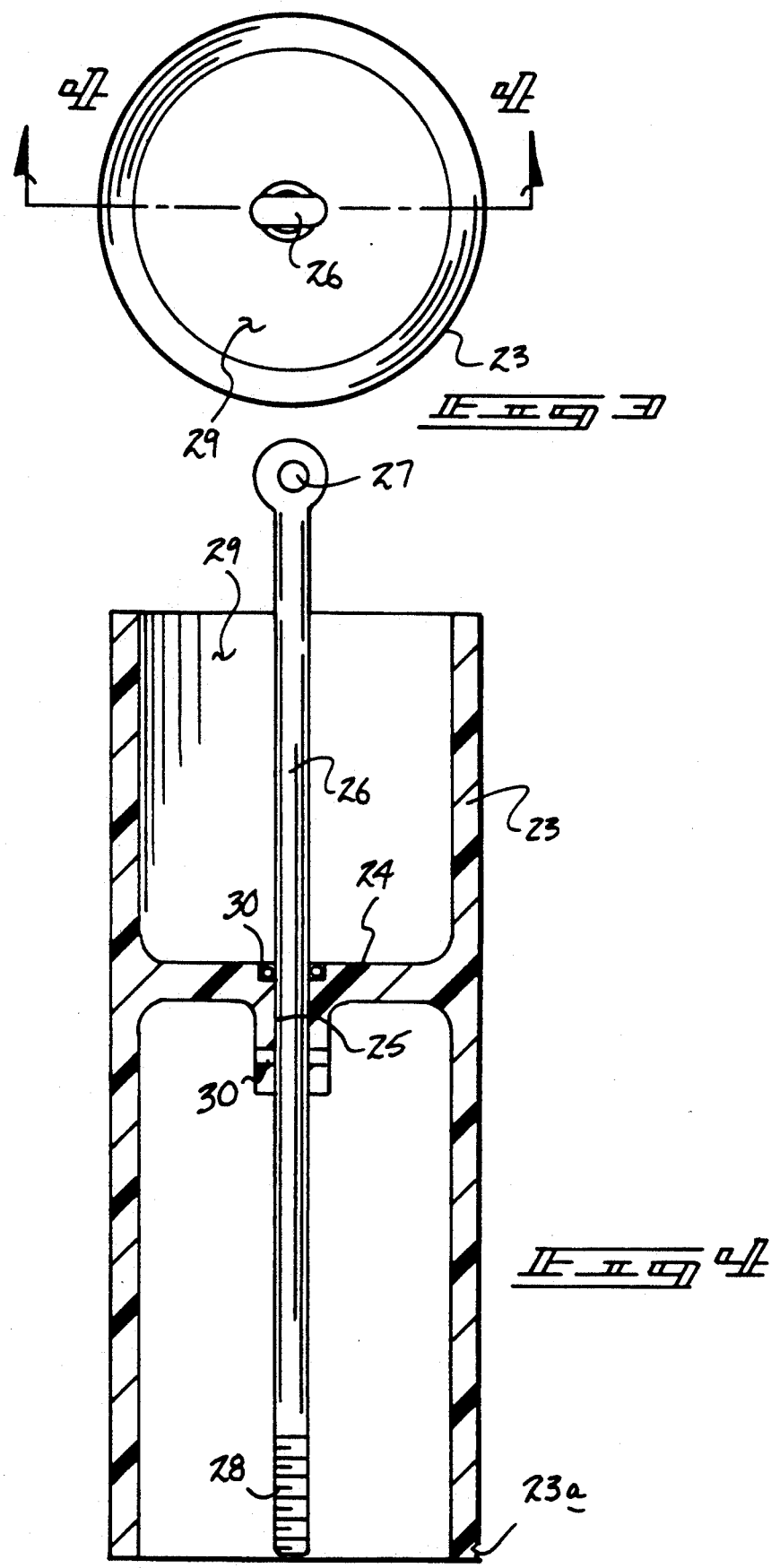

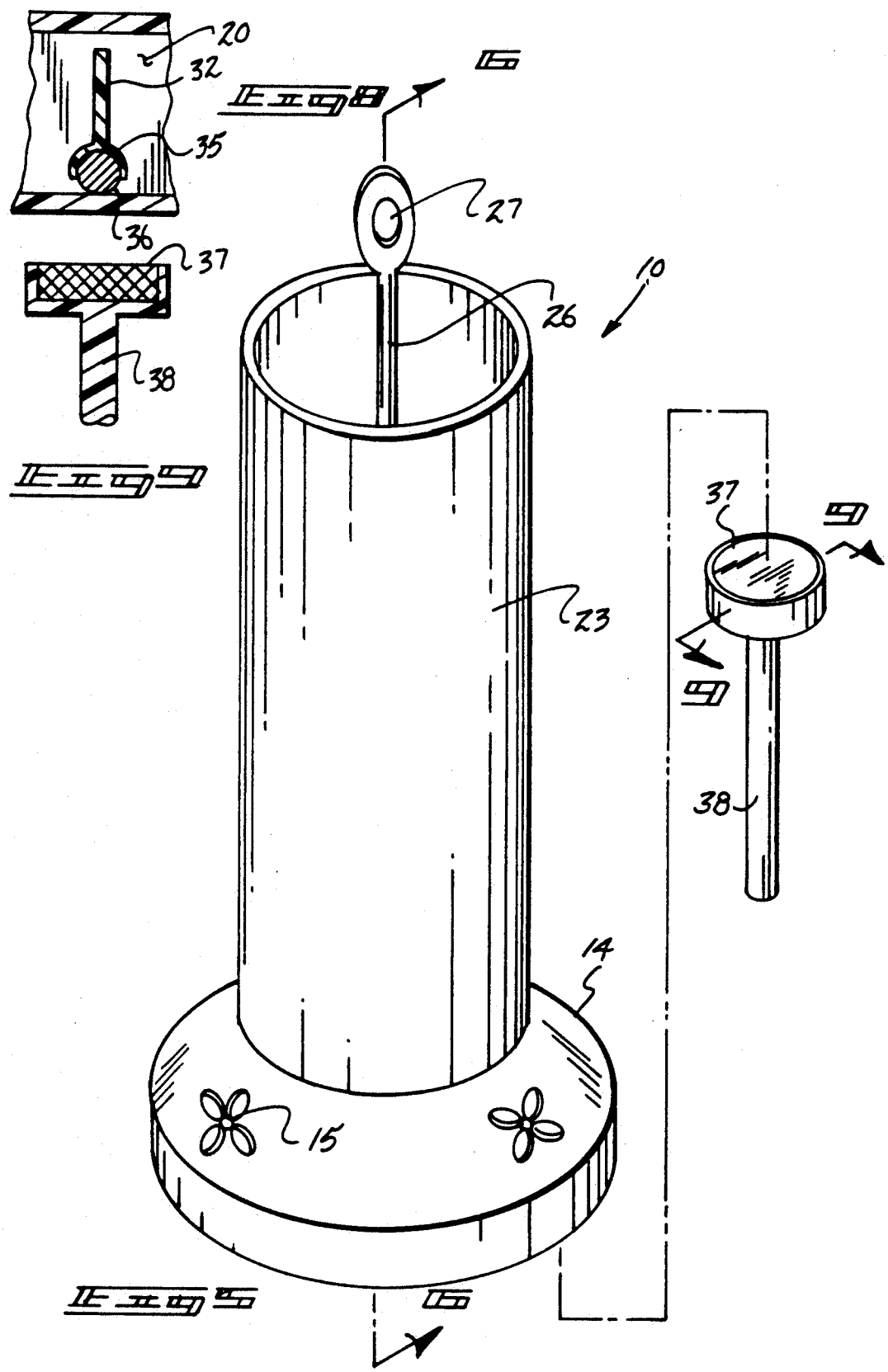

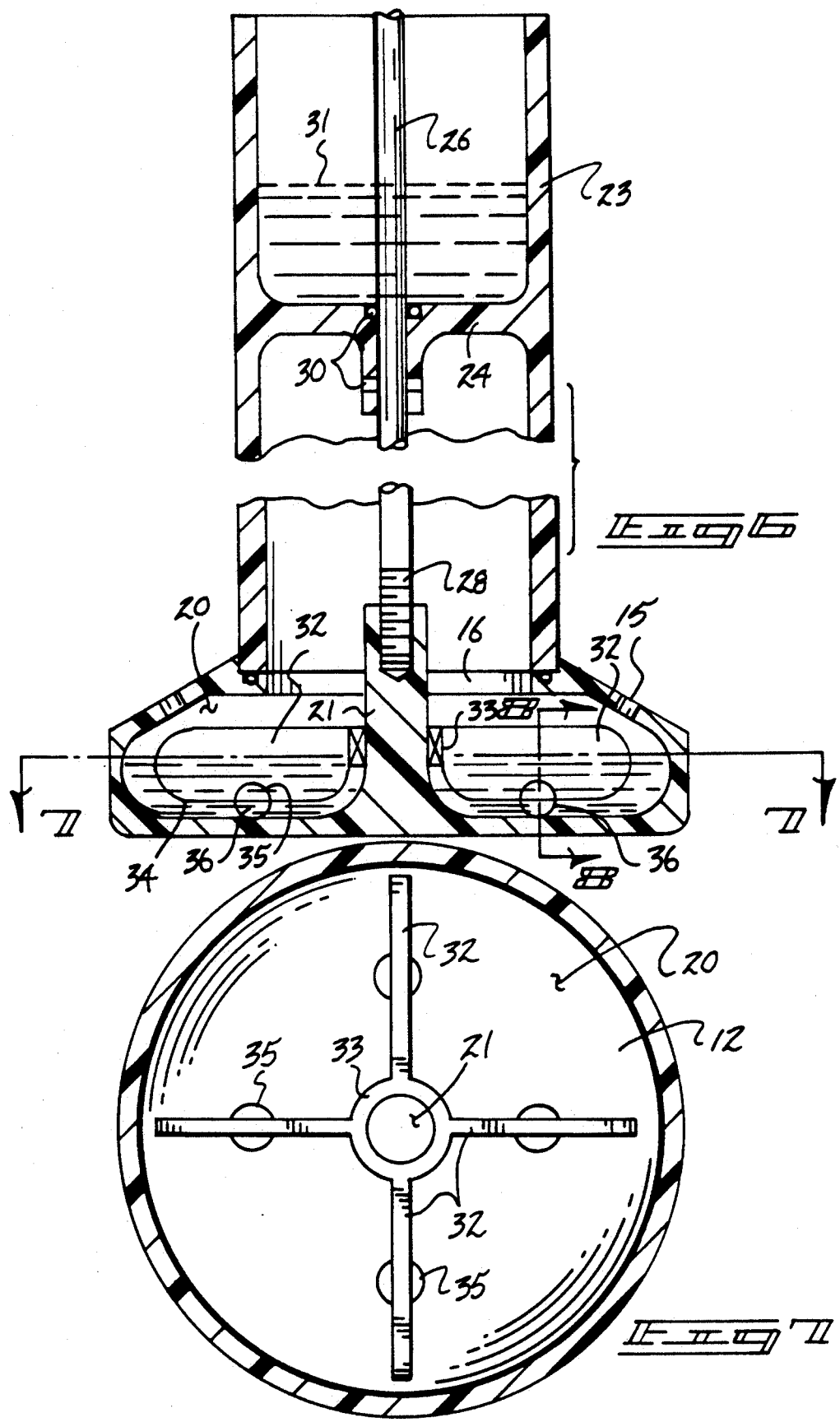

5,247,904

HUMMINGBIRD FEEDER

BACKGROUND OF THE INVENTION

1. Field of the Invention

The field of invention relates to hummingbird feeder structure, and more particularly pertains to a new and improved hummingbird feeder wherein the same is arranged to prevent access to contents within the hummingbird feeder by crawling insects and the like.

2. Description of the Prior Art

Hummingbird feeder structure of various types have been utilized throughout the prior art and exemplified in the U.S. Pat. Nos. 4,901,673; 4,558,662; 3,913,527; and 4,691,665.

The instant invention attempts to overcome deficiencies of the prior art by providing for a hummingbird feeder having a water barrier containing fluid preventing access to the hummingbird food supply and in this respect, the present invention substantially fulfills this need.

SUMMARY OF THE INVENTION

In view of the foregoing disadvantages inherent in the known types of hummingbird feeders now present in the prior art, the present invention provides a hummingbird feeder wherein the same employs a moat-like arrangement relative to a mounting post of the hummingbird feeder preventing access to contents of the hummingbird feeder. As such, the general purpose of the present invention, which will be described subsequently in greater detail, is to provide a new and improved hummingbird feeder which has all the advantages of the prior art hummingbird feeders and none of the disadvantages.

To attain this, the present invention provides a hummingbird feeder including a feeder base receiving a hummingbird feed solution therewithin, wherein the base has mounted thereto in a coaxially aligned relationship a support cylinder. The support cylinder includes a divider wall directed orthogonally relative to the axis of the support cylinder, with the divider wall accommodating fluid therewithin. The feeder base having a mounting post and a support post directed through the support cylinder, and the divider wall received within the support post, whereupon suspension of the hummingbird feeder by the support post prevents crawling insects from access to the base due to the support post being positioned within a surrounding body of fluid.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved hummingbird feeder which has all the advantages of the prior art hummingbird feeders and none of the disadvantages.

It is another object of the present invention to provide a new and improved hummingbird feeder which may be easily and efficiently manufactured and marketed.

It is a further object of the present invention to provide a new and improved hummingbird feeder which is of a durable and reliable construction.

An even further object of the present invention is to provide a new and improved hummingbird feeder which is susceptible of a low cost of manufacture with regard to both materials and labor, and which accordingly is then susceptible of low prices of sale to the consuming public, thereby making such hummingbird feeder economically available to the buying public.

Still yet another object of the present invention is to provide a new and improved hummingbird feeder which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic top view of the support cylinder of the invention.

FIG. 4 is an orthographic view, taken along the lines 4—4 of FIG. 3 in the direction indicated by the arrows.

FIG. 5 is an isometric illustration of the invention in an assembled configuration.

FIG. 6 is an orthographic view, taken along the lines 6—6 of FIG. 5 in the direction indicated by the arrows.

FIG. 7 is an orthographic view, taken along the lines 7—7 of FIG. 6 in the direction indicated by the arrows.

FIG. 8 is an orthographic view, taken along the lines 8—8 of FIG. 6 in the direction indicated by the arrows.

FIG. 9 is an orthographic view, taken along the lines 9—9 of FIG. 5 in the direction indicated by the arrows.

DESCRIPTION OF THE PREFERRED EMBODIMENT

Figure 1:
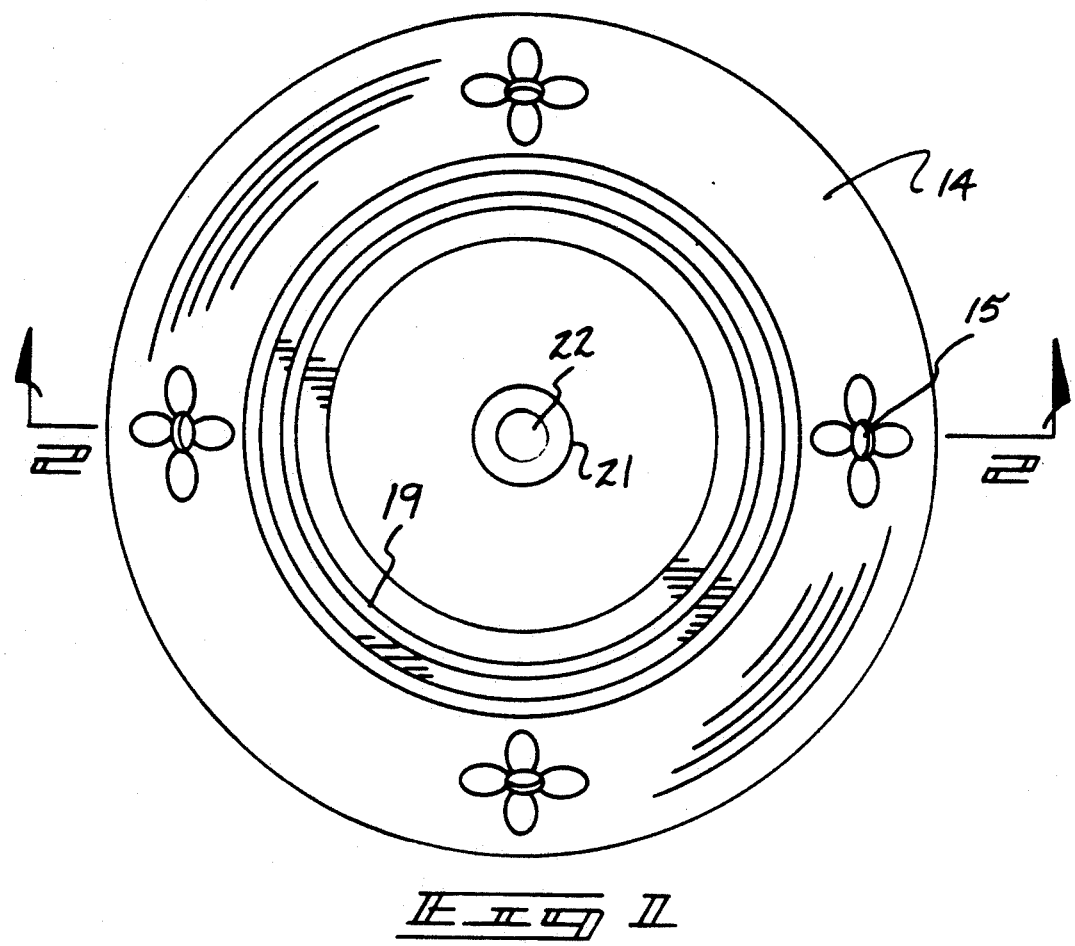
FIG. 1 is an orthographic top view of the base structure.
Figure 2:
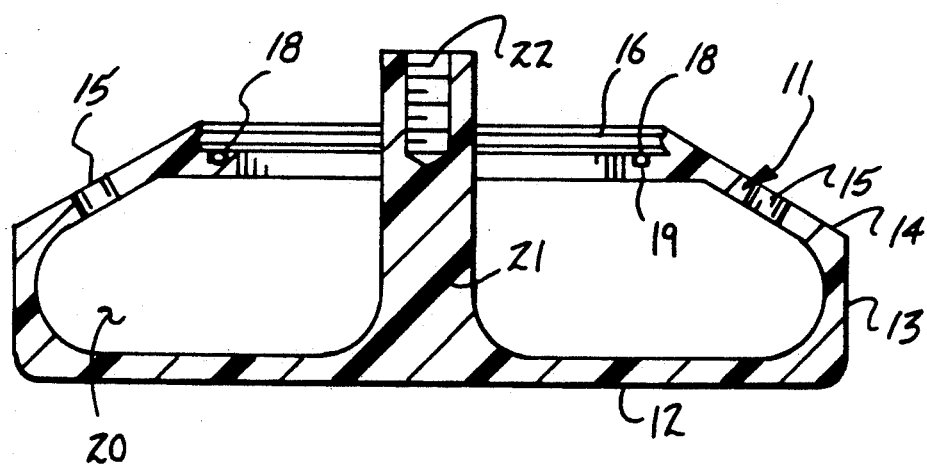
FIG. 2 is an orthographic view, taken along the lines 2—2 of FIG. 1 in the direction indicated by the arrows.

With reference now to the drawings, and in particular to FIGS. 1 to 9 thereof, a new and improved hummingbird feeder embodying the principles and concepts of the present invention and generally designated by the reference numeral 10 will be described.

More specifically, the hummingbird feeder 10 of the instant invention essentially comprises a feeder base 11, having a base floor 12, with a continuous side wall 13 extending thereabout, with a conical outer top wall 14 extending from the side wall 13 towards a central internally threaded opening 16 coaxially aligned relative to the floor 12 spaced thereabove. Feed ports 15 are directed through the outer wall 14 for access to the base cavity 20 to contain a solution for consumption by hummingbirds. A flange 17 of annular construction is positioned within the internally threaded opening 16 at a lower end thereof, having a sealing ring 18 positioned within a groove 19. A mounting post 21 is provided fixedly mounted to the floor 12 extending above the internally threaded opening 16, with the mounting post having a mounting post internally threaded bore 22 coaxially aligned relative to the mounting post and to the feeder base 11. The flange 17 is arranged to sealingly receive in contiguous engagement the lower distal end of a support cylinder 23, having a cylinder lower threaded end 23a threadedly received within the internally threaded opening 16 and arranged for engagement with the flange 17. A divider wall 24 is mounted within the support cylinder below and upper distal end of the support cylinder, with the divider wall having a divider wall bore 25 to receive a support post rotatably therethrough. The support post 26 includes an eyelet opening 27 at its upper distal end, with its lower distal end having support post threaded portion 28 received within the internally threaded bore 22 of the mounting post 21. A plurality of spaced annular seals 30 are received within the divider wall bore 25 in engagement with the support post 26 to provide for fluid sealing of the support cylinder cavity 29 within the support cylinder positioned above the divider wall 24. As the support post 26 is coaxially aligned within the support cylinder 23, it is received within the internally threaded bore 22. A fluid 31, such as water, pesticide, and the like, is positioned within the support cylinder cavity 29. In this manner, crawling insects such as ants and the like are not capable of accessing the exterior surface of the support cylinder 23 due to the moat-like arrangement within the support cylinder cavity 29.

The FIGS. 5-9 indicate the use of the invention further employing mixing plates 32 mounted fixedly to a collar 33 that in turn is rotatably mounted about the mounting post 21 within the base cavity 20. Each of the mixing plates 32 includes a plate bottom edge 34 having a mounting cup 35 rotatably mounting a ferrous sphere 36 therewithin. A magnetic disc 37 is provided mounted upon a support shaft 38, wherein the magnetic disc is positioned in adjacency to the floor 12, whereupon rotation of the magnetic disc 37 relative to the floor by manual manipulation permits stirring within the cavity 20 for stirring of the fluid contents of the cavity.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hummingbird feeder, comprising, a feeder base, having a support cylinder removably mounted relative to the feeder base, with the feeder base having a base floor and a base surrounding side wall, and a top wall, the top wall having a plurality of feeding ports directed therethrough, and an internally threaded opening directed through the top wall positioned above the base floor, and the internally threaded opening having an annular flange fixedly mounted within the internally threaded opening, with the flange including a groove and a sealing ring mounted within the groove, and the support cylinder including a support cylinder first end, having an externally threaded portion arranged for reception with the internally threaded opening, and a support cylinder second end, and the support cylinder including a divider wall positioned between the first end and the second end, and a support cylinder cavity positioned between the support cylinder second end and the divider wall having a fluid contained therewithin, and a plurality of mixing plates fixedly mounted to a collar, the collar rotatably mounted about the mounting post within the feeder base, wherein each of the mixing plates includes a plate bottom edge, with at least one of the mixing plates including a mounting cup fixedly mounted to said plate bottom edge, and ferrous sphere mounted with the mounting cup, with the ferrous sphere arranged for contiguous and rolling communication with the feeder base floor.

2. A hummingbird feeder as set forth in claim 1 including a mounting post fixedly mounted to the floor extending from the floor through the internally threaded opening and projecting beyond the top wall, with the mounting post having a mounting post internally threaded bore, and the divider wall having a divider wall bore, with a support post rotatably mounted through the divider wall bore, and the support post having at least one sealing ring mounted within the divider wall bore in surrounding relationship relative to the support post, and the support post including a support post threaded portion arranged for reception within the mounting post internally threaded bore, with the support post having an eyelet opening spaced from the support post threaded portion, with the support post and the mounting post coaxially aligned, and the mounting post orthogonally oriented relative to the base floor.

3. A hummingbird feeder as set forth in claim 2 including a magnetic disc, the magnetic disc arranged for contiguous communication with the feeder base floor exteriorly of the feeder base for magnetic communication with the ferrous sphere permitting rotation of the magnetic disc about the feeder base floor for rotation of the mixing plates and agitation of a feeding fluid within the feeder base.

* * * * *